Figure 1:
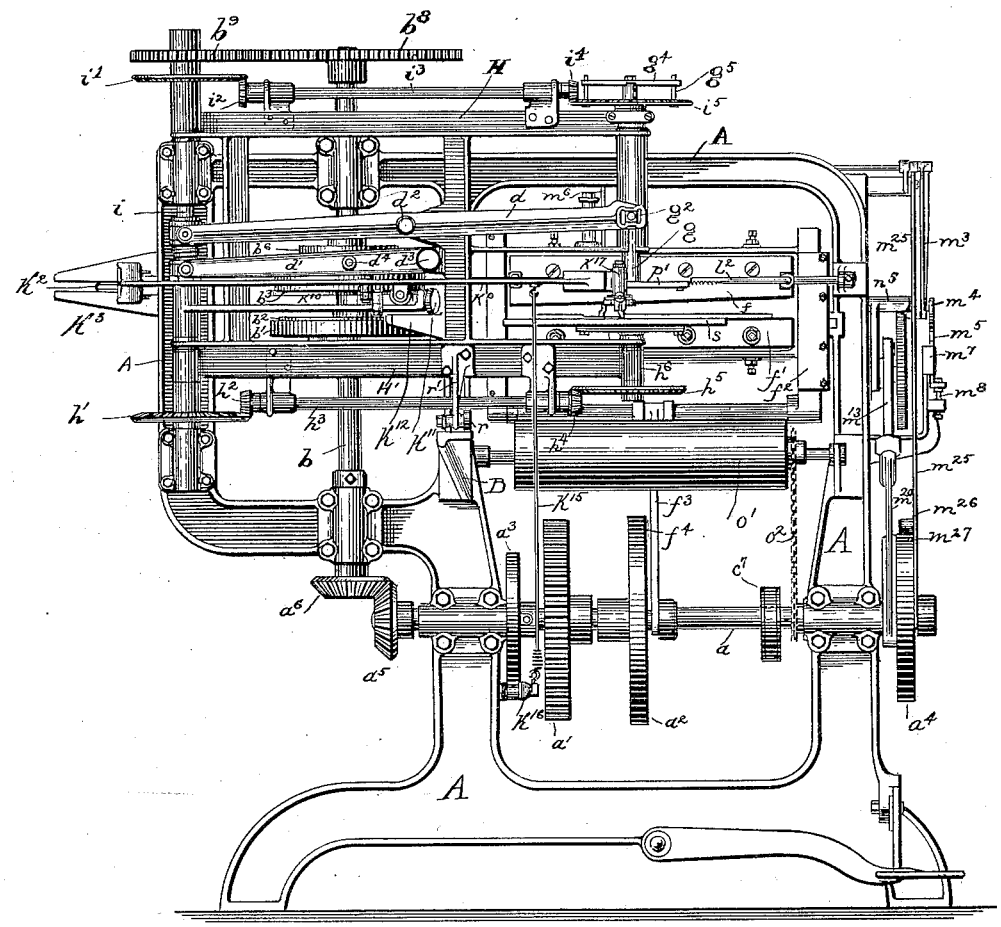

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)

(No Model.) 14 Sheets—Sheet 1.

WITNESSES
G. Henry Marsh.
Sydney E. Taft.

INVENTORS
Victor Beauregard
and
Charles S. Gooding
by their attorney,
Reuben L. Roberts

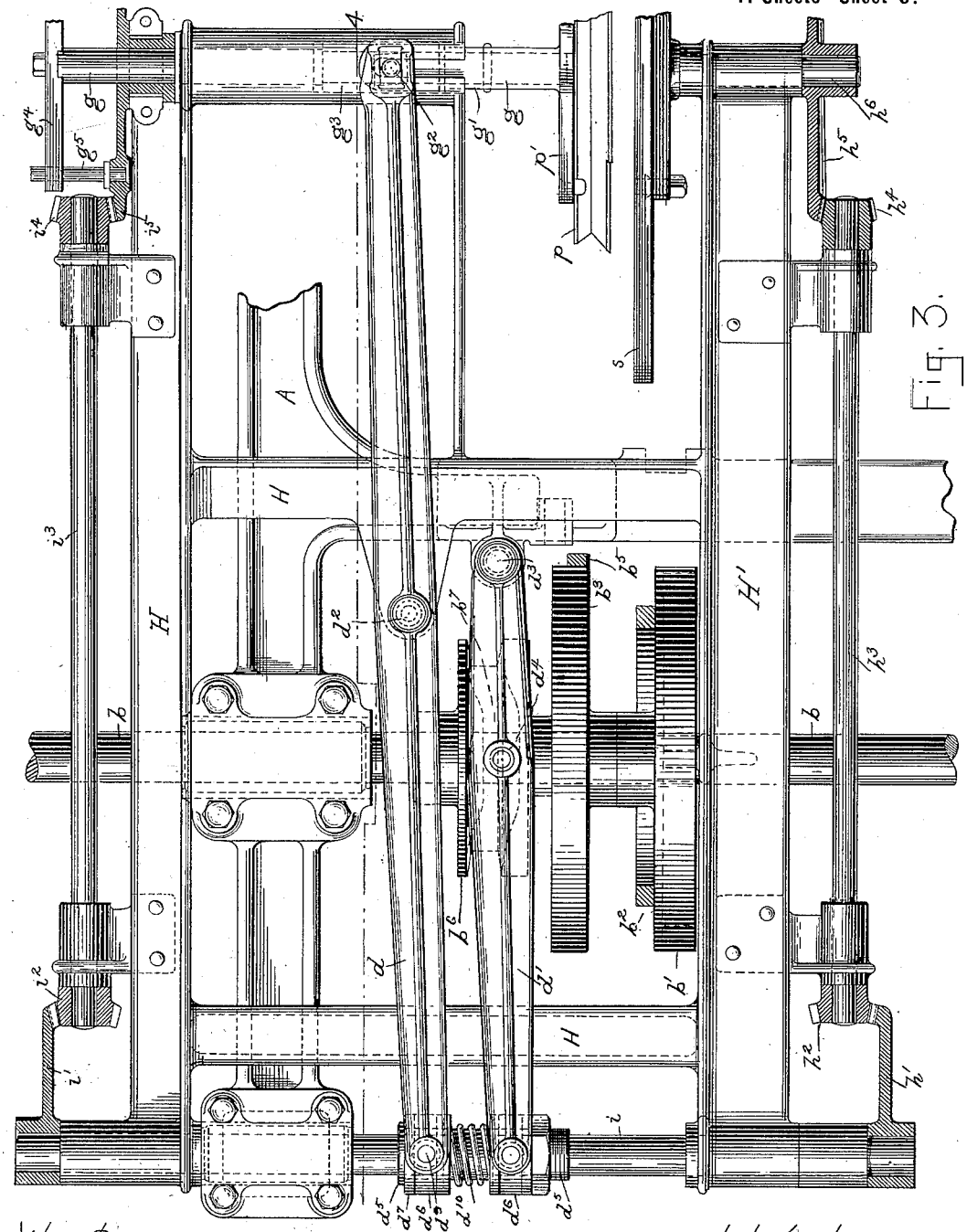

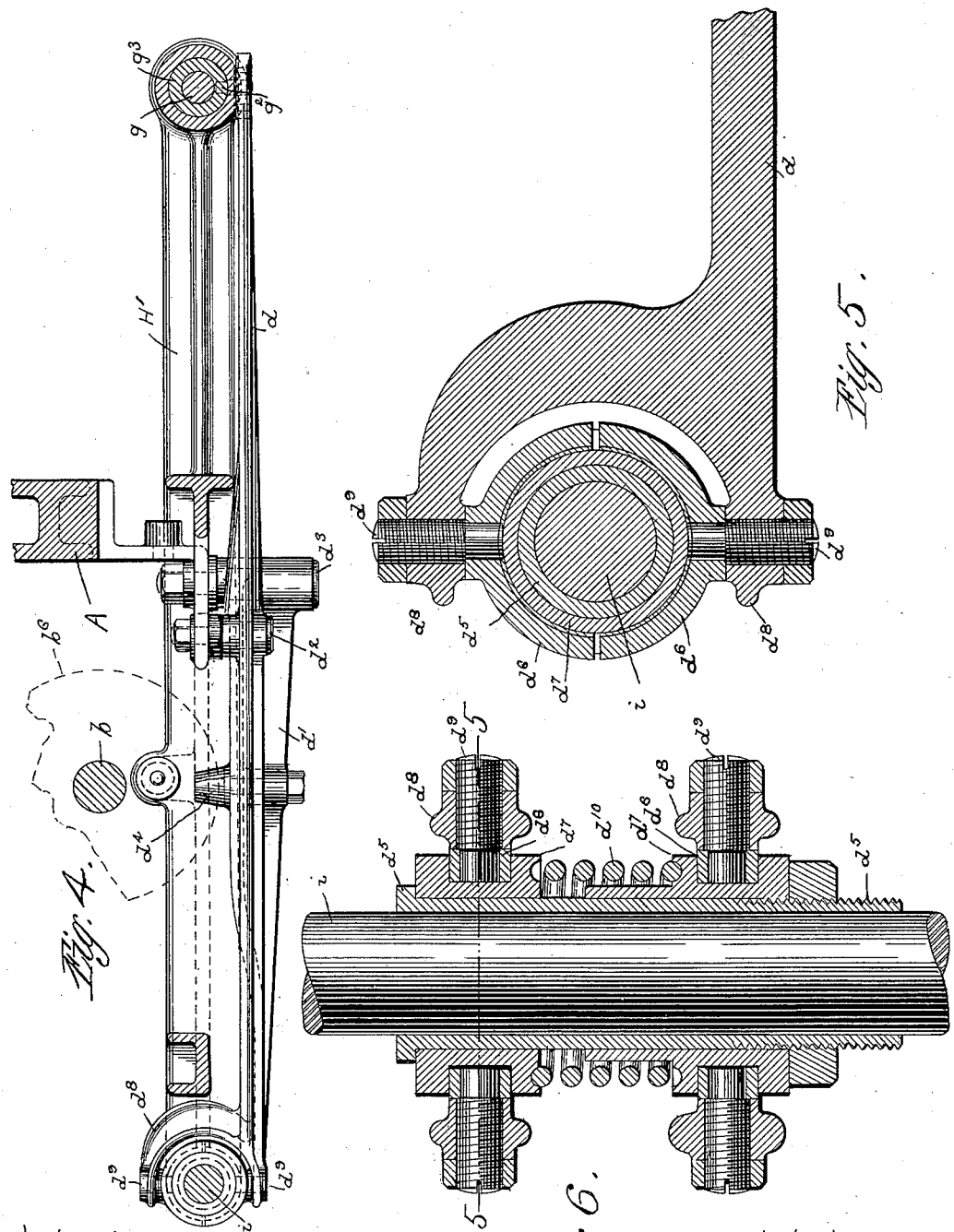

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 5.
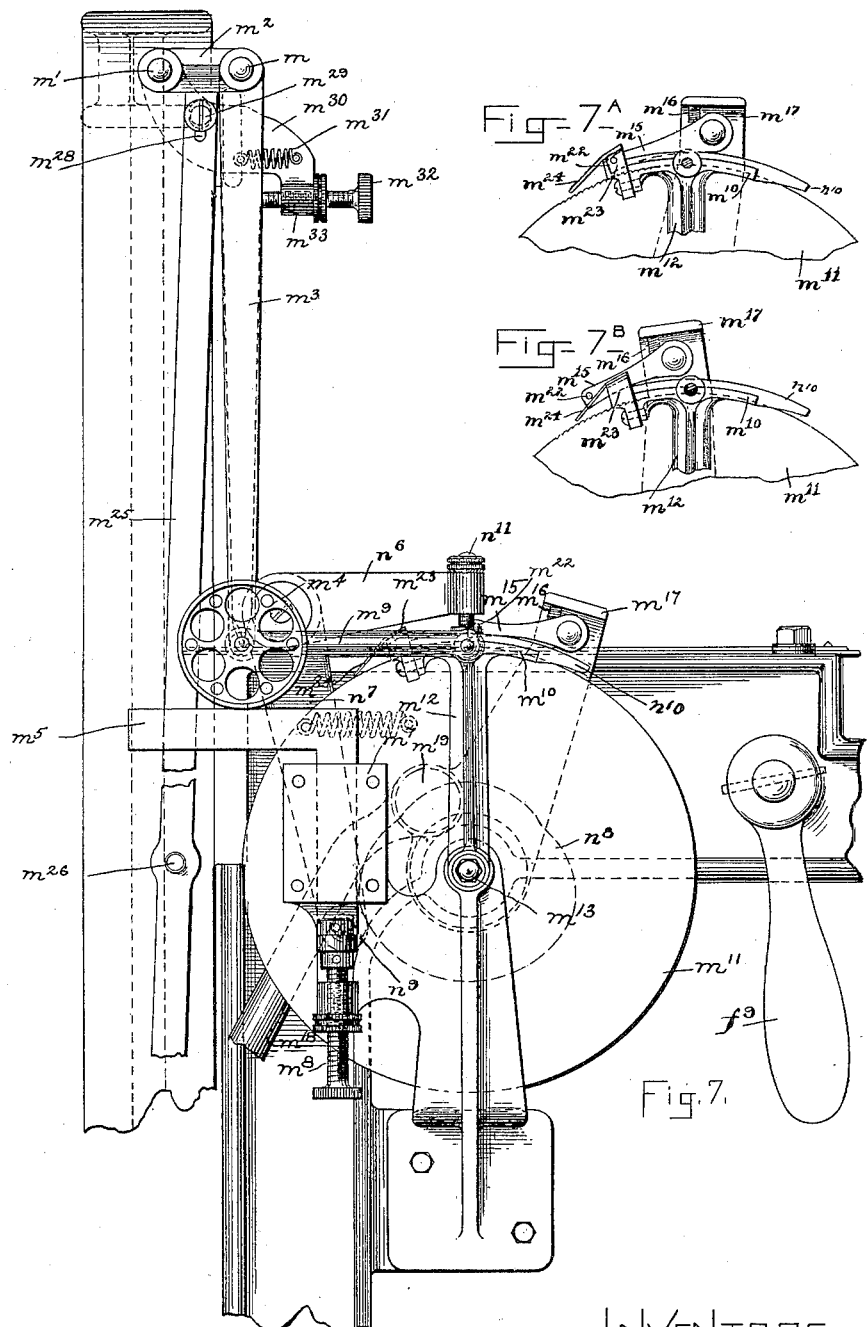
Witnesses
Henry Marsh
Sydney E. Taft
Inventors—
Victor Beauregard
and
Charles S. Gooding
by their attorney,
Reuben L. Roberts.

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 6.
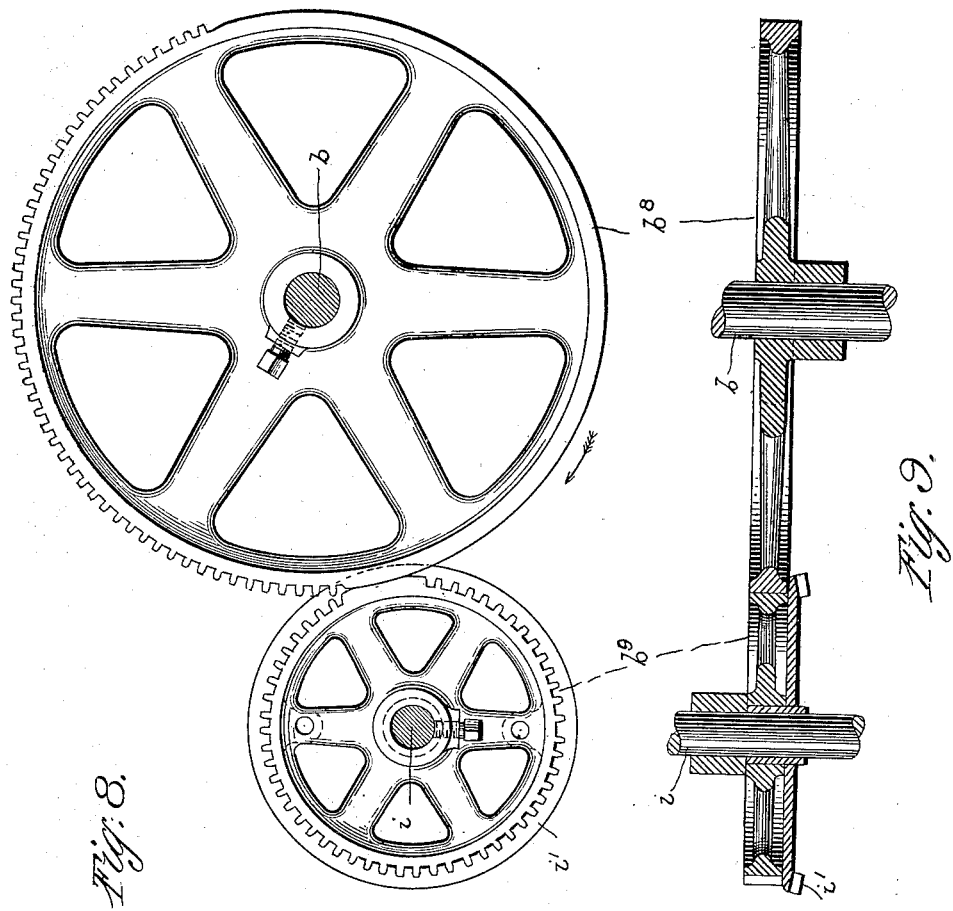

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 7.

WITNESSES
Henry Marsh.
Sydney E. Taft.

INVENTORS
Victor Beauregard
and
Charles S. Gooding
by their attorney,
Reuben L. Roberts.

THE NORRIS PETERS CO., PHOTO-LITHO., WASHINGTON, D. C.

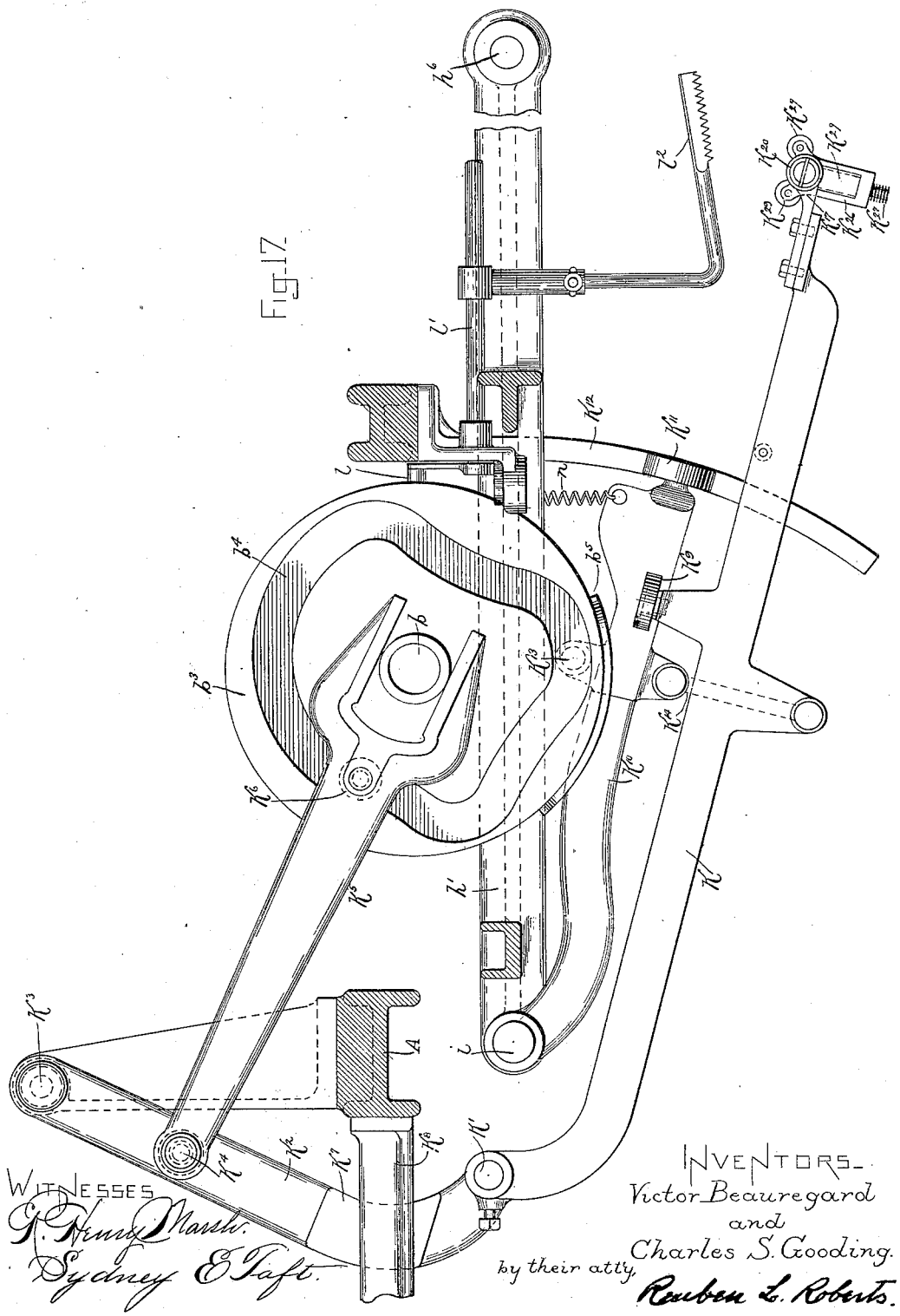

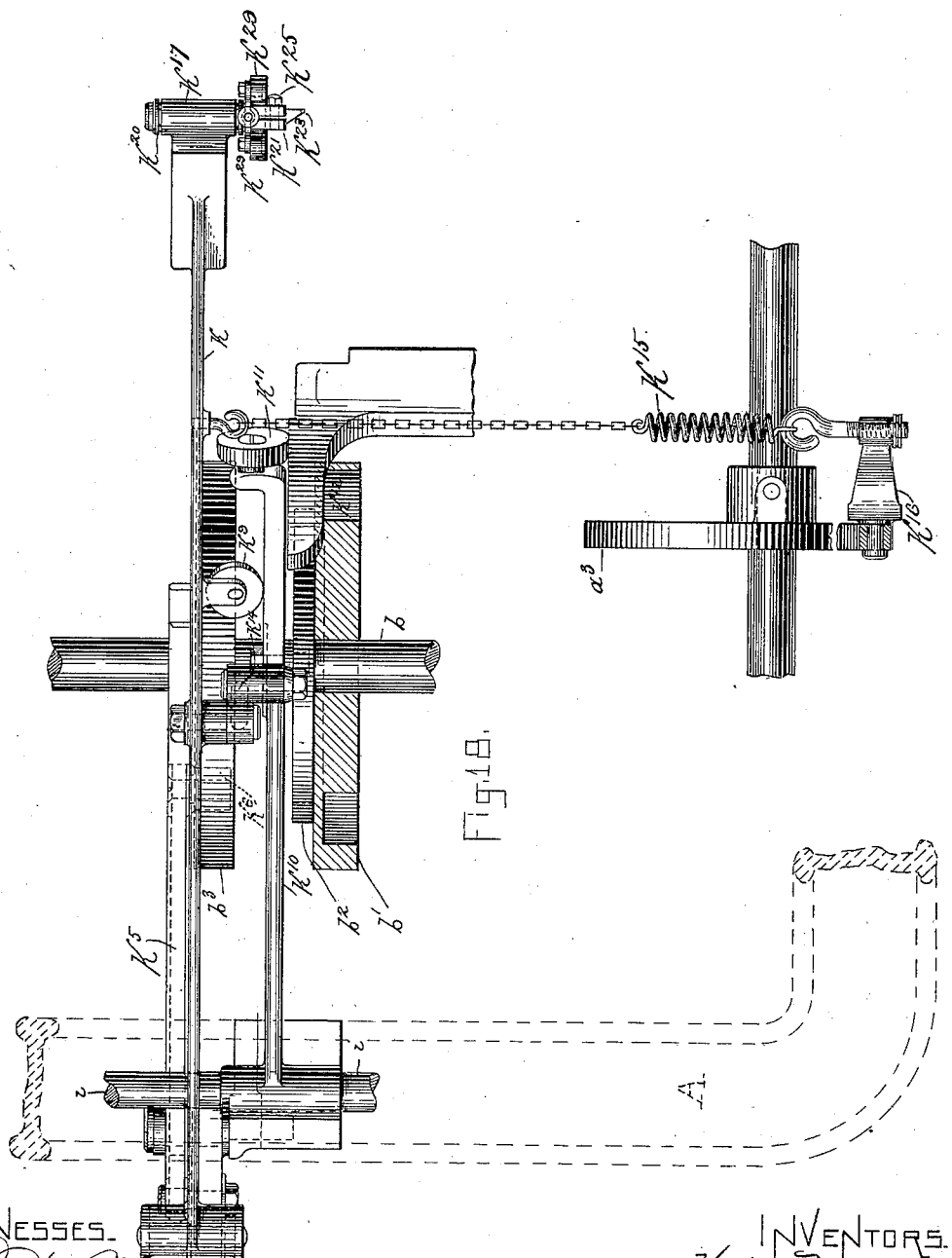

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 10.
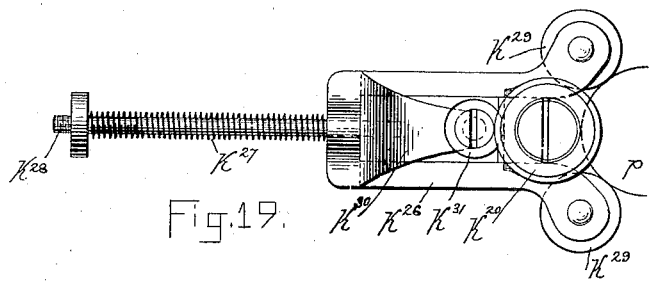
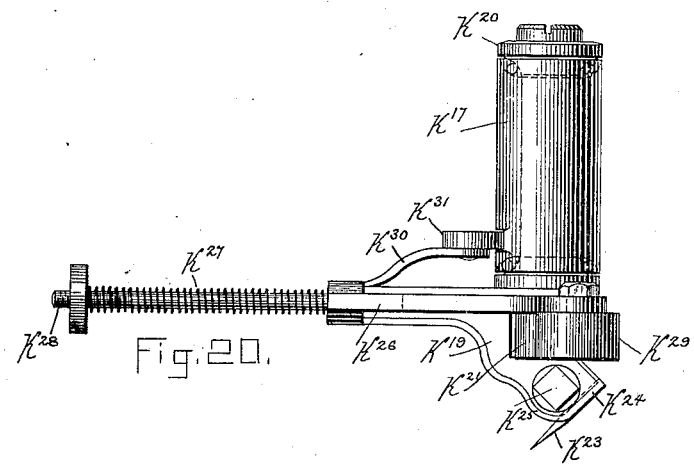
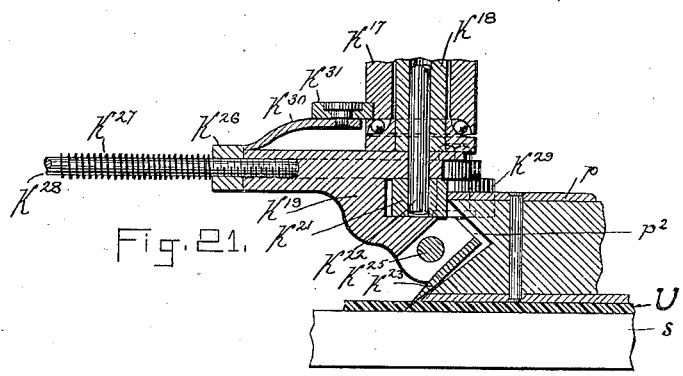
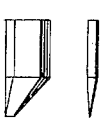

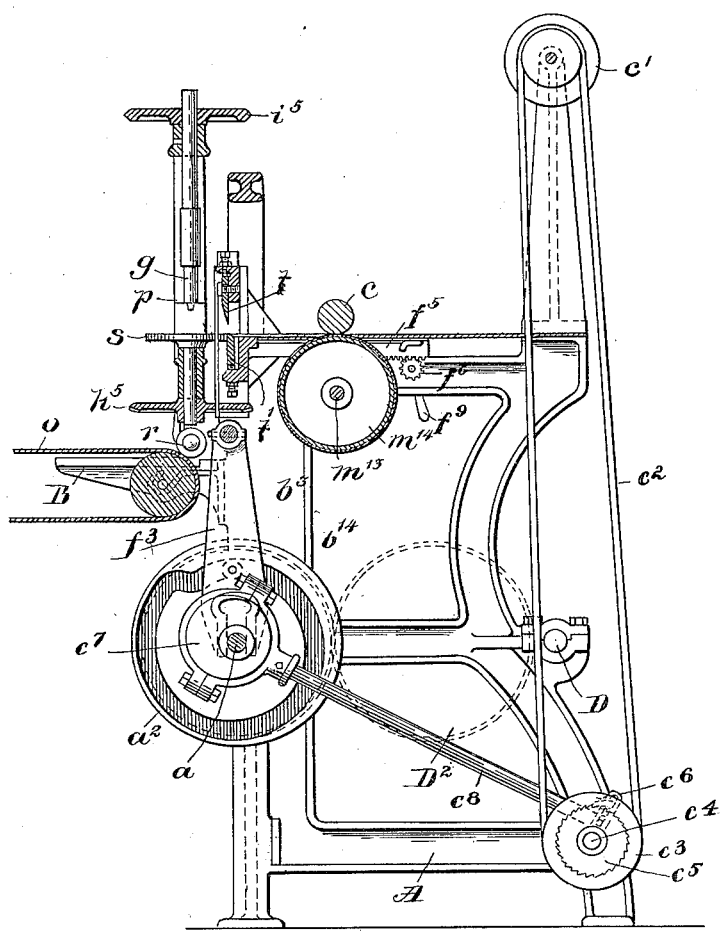
Fig-23-

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 12.

Witnesses
R. Henry Marsh.
Sydney E. Taft.

Inventors
Victor Beauregard
and
Charles S. Gooding
by their attorney,
Reuben L. Roberts.

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 13.
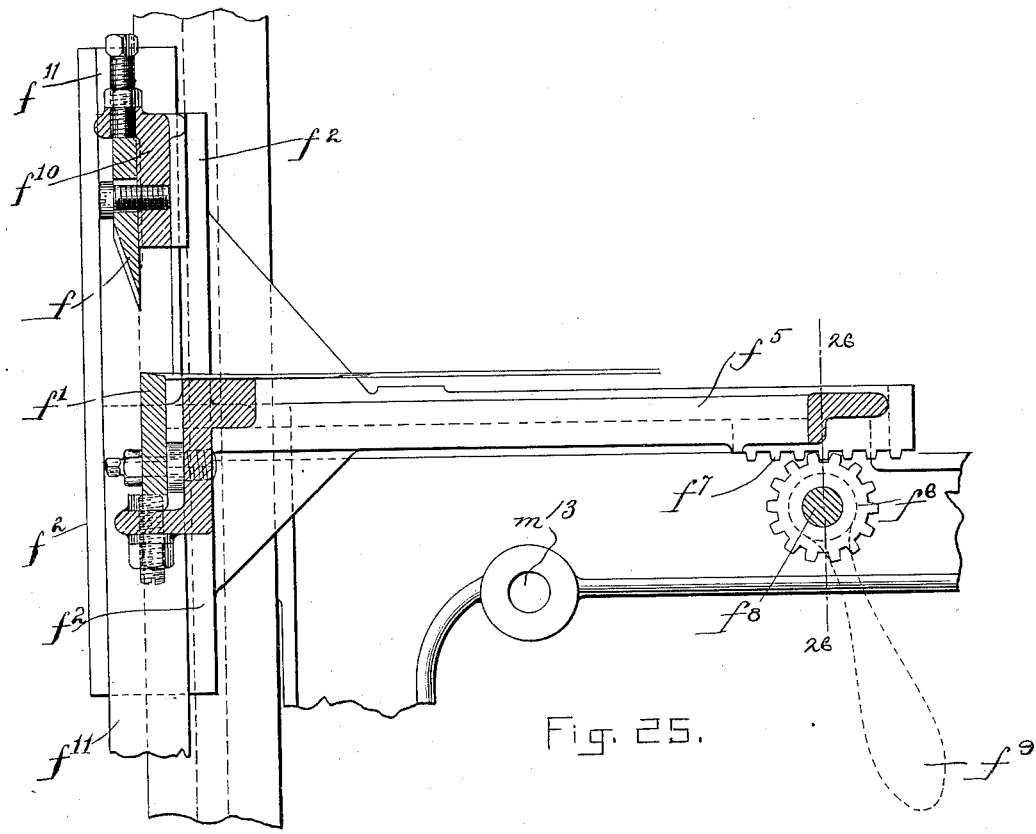
Fig. 25.
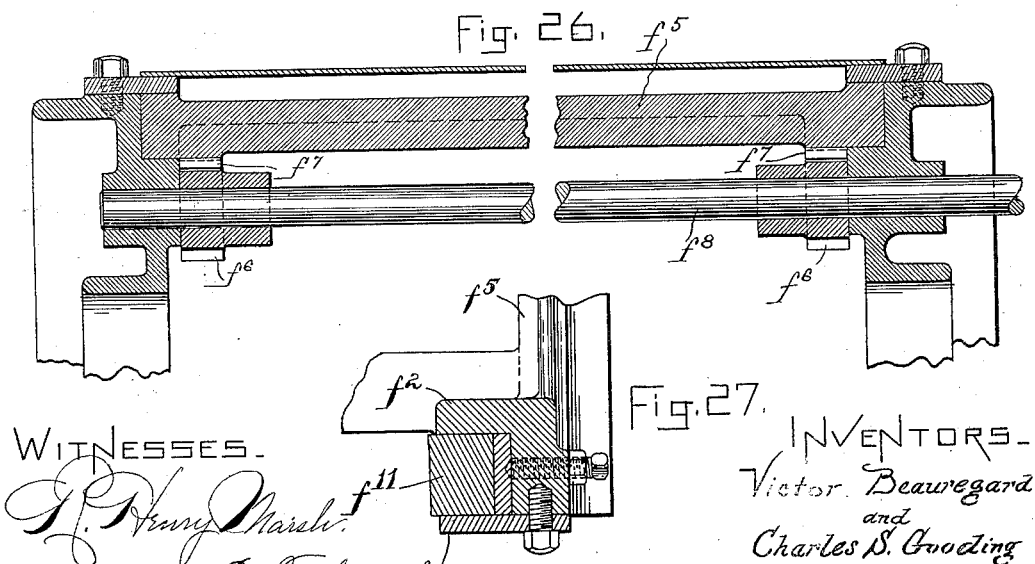
Fig. 26.
Fig. 27.
WITNESSES.
INVENTORS.
Victor Beauregard
and
Charles S. Gooding
by their attorney,
Reuben L. Roberts.

No. 652,159. Patented June 19, 1900.
V. BEAUREGARD & C. S. GOODING.
MACHINE FOR CUTTING BOOT OR SHOE SOLES, &c.
(Application filed Apr. 5, 1900.)
(No Model.) 14 Sheets—Sheet 14.
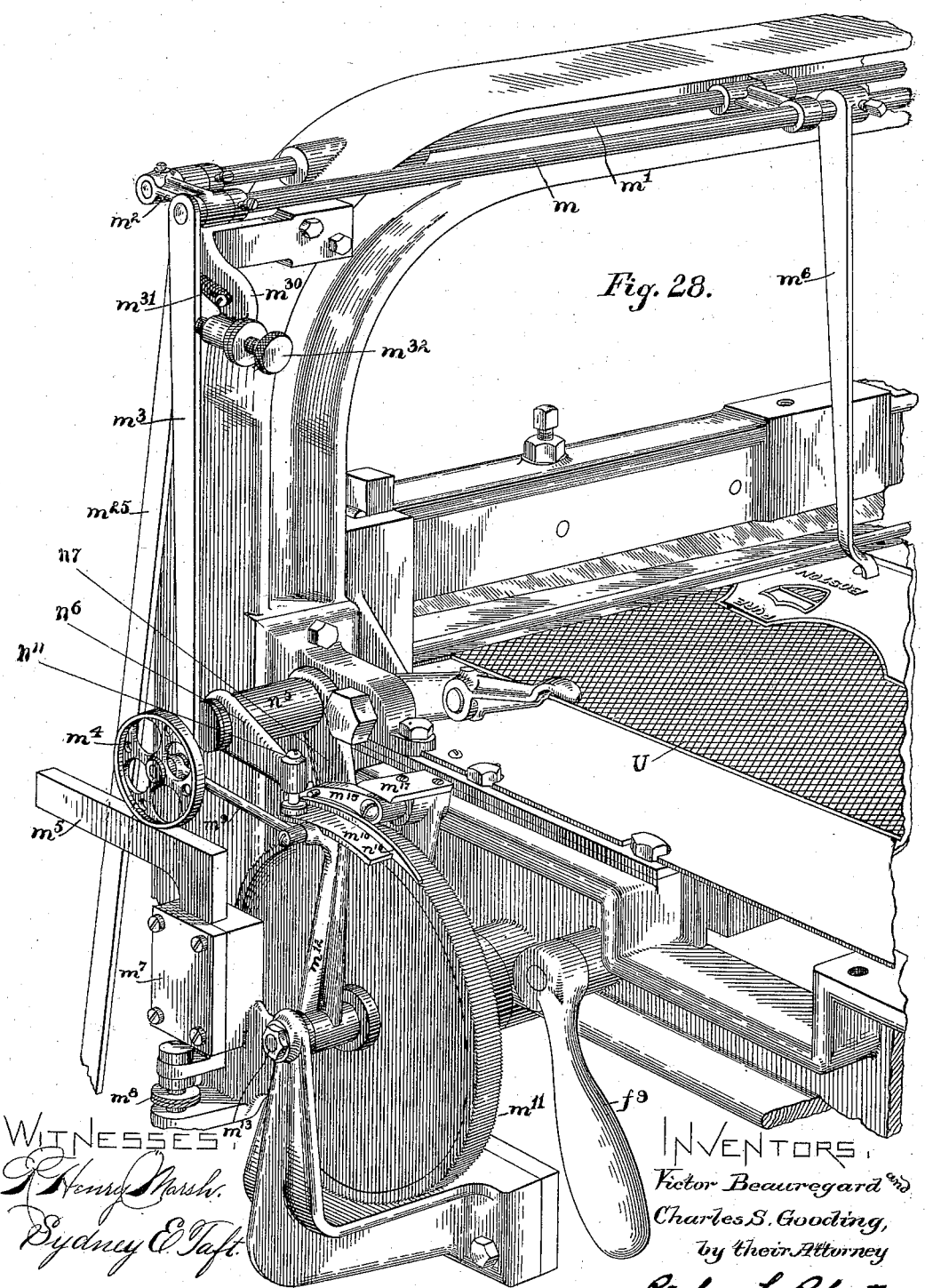

UNITED STATES PATENT OFFICE.

VICTOR BEAUREGARD, OF BOSTON, AND CHARLES S. GOODING, OF BROOKLINE, MASSACHUSETTS, ASSIGNORS TO ROBERT D. EVANS AND JOHN S. LOCKWOOD, OF BOSTON, MASSACHUSETTS.

MACHINE FOR CUTTING BOOT OR SHOE SOLES, &c.

SPECIFICATION forming part of Letters Patent No. 652,159, dated June 19, 1900.

Application filed April 5, 1900. Serial No. 11,774. (No model.)

*To all whom it may concern:*

Be it known that we, VICTOR BEAUREGARD, of Boston, in the county of Suffolk, and CHARLES S. GOODING, of Brookline, in the county of Norfolk, Commonwealth of Massachusetts, have invented certain new and useful Improvements in Machines for Cutting Boot or Shoe Soles and other Articles of Curvilinear Outline from Sheet Material, of which the following description is a specification.

This invention relates to a machine similar to that described and shown in our Letters Patent No. 593,537, dated November 9, 1897, and No. 613,197, dated October 25, 1898; and it consists, chiefly, in the improved construction of the mechanism by which the feeding of the material to be cut is regulated, the "measuring-finger," as it has been called, moving in a horizontal line instead of a curve, in the construction of the form or pattern according to which the material is cut and the means for clamping it to its holder, in the construction of the holder for the cutter or trimming-knife, and also in various minor improvements in other portions of the operative parts of the machine hereinafter described.

As in our prior patents above mentioned, the machine herein shown is represented with a pattern of the form used for cutting boot and shoe soles, and a machine to be used for that purpose is more particularly referred to in the description and illustrated in the drawings, wherein—

Figure 2:
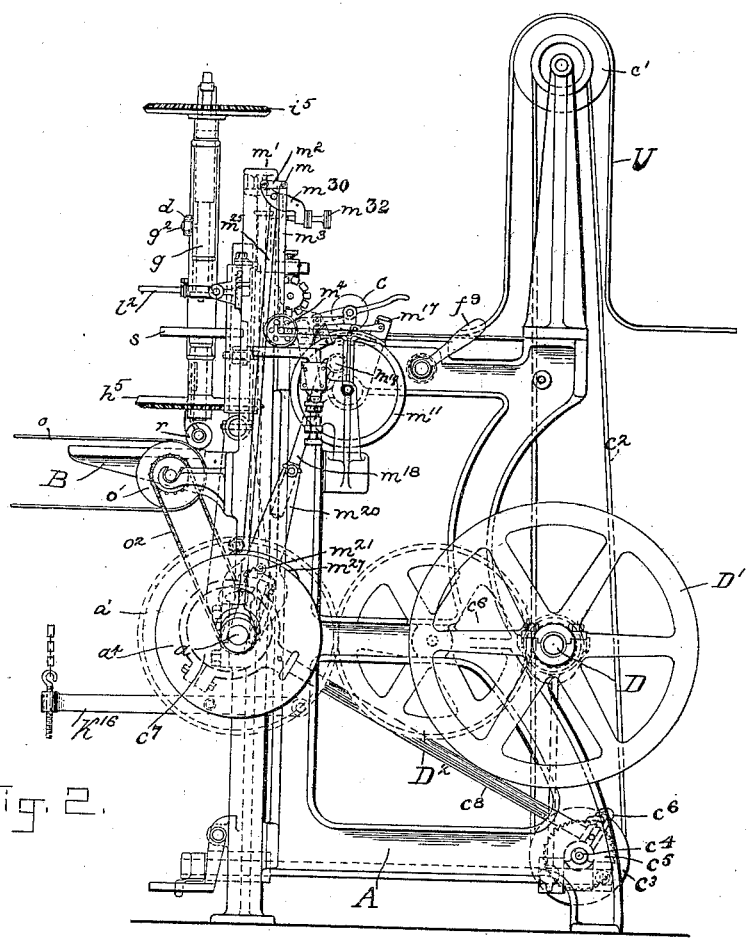
Figure 10:
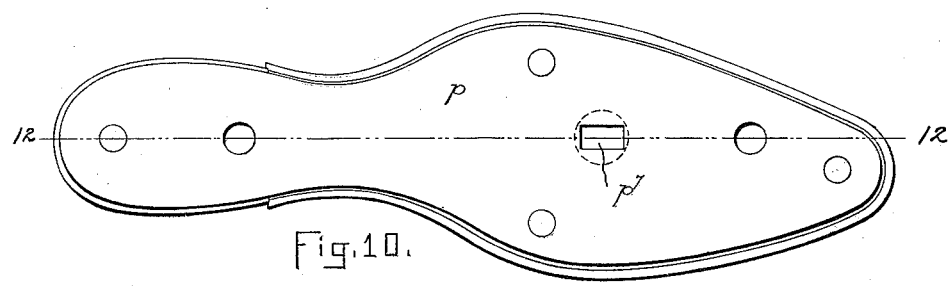
Figure 11:
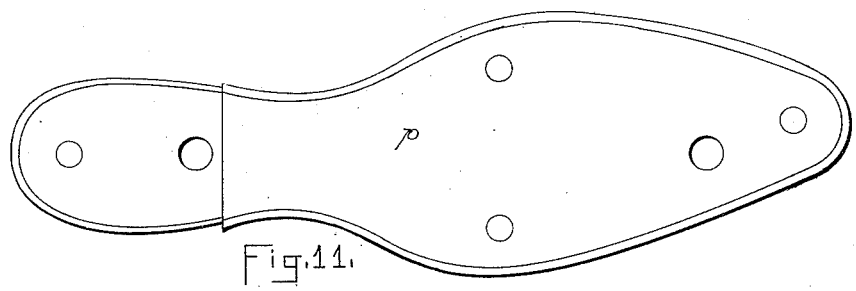
Figure 12:
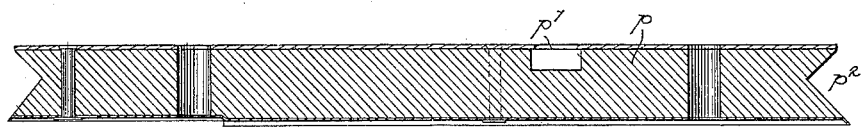
Figure 13:
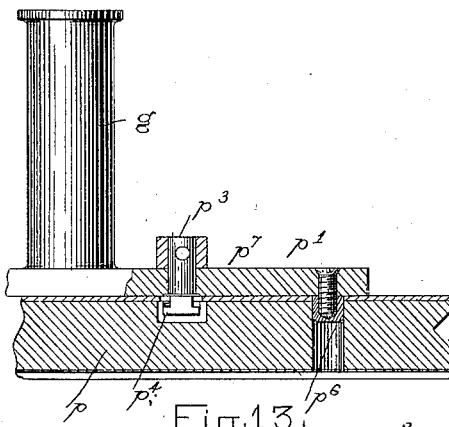
Figure 14:
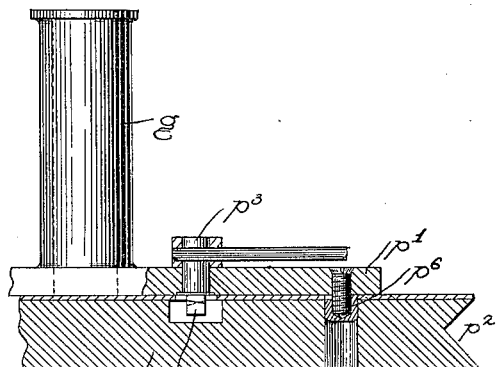
Figures 15, 16:
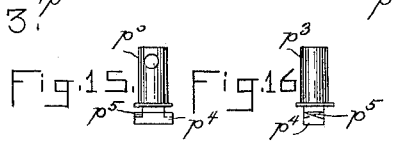
Figure 24:
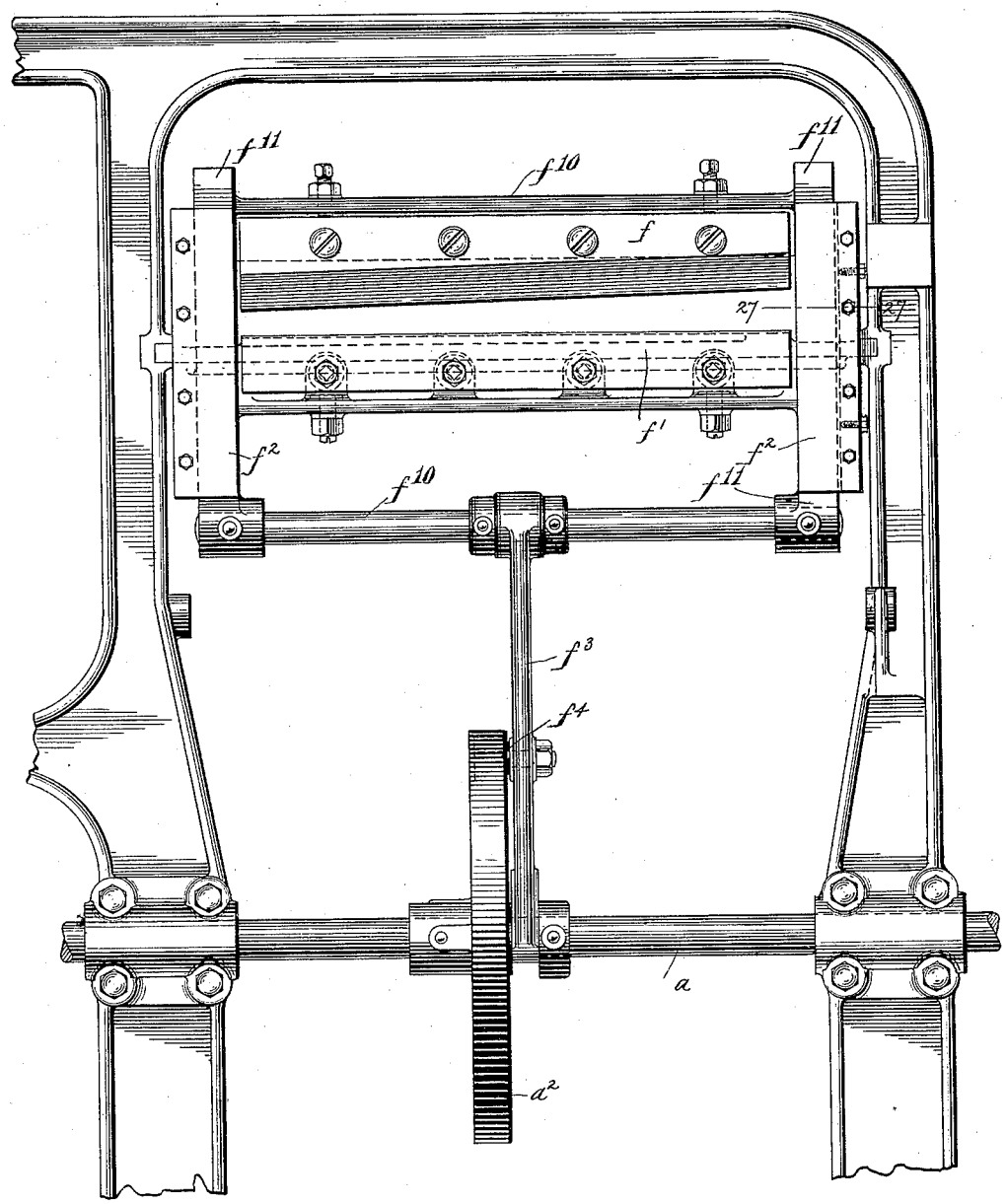

Figure 1 is a front elevation of the machine; Fig. 2, a side elevation viewed from the right of Fig. 1. Fig. 3 is a front elevation of the portion of the machine which supports and operates the blank-support and clamping-pattern, the gears by which that support and clamp are rotated being in section. Fig. 4 is a plan view of the same portion, with the upper part removed, on line 4 4, Fig. 3. Fig. 5 is a cross-section through the joint of the lever which supports the clamping-pattern, as at 5 5, Fig. 6. Fig. 6 is a vertical section of the sleeves and joints of the two levers which raise and lower the clamping-pattern, which sleeves are on the shaft $i$. Fig. 7 is a side elevation of a detached portion of the machine viewed from the right of Fig. 1, showing the stock-feeding mechanism and the devices by which the amount to be fed at each stroke of the feeding mechanism is determined. Figs. $7^a$ and $7^b$ are details showing, respectively, the stock-feeding pawl in its forward movement as it is about to engage the ratchet-wheel and the same pawl just after it is withdrawn from the ratchet-wheel in its return movement. Fig. 8 is an enlarged plan view of the gears which produce the intermittent motion of the clamp and stock-support; Fig. 9, a section through the axes of those gears; Fig. 10, a plan of the top of the clamping-pattern; Fig. 11, a plan of the bottom of the clamping-pattern; Fig. 12, a longitudinal vertical section of it; Fig. 13, a longitudinal vertical section of a portion of the pattern, showing the devices by which it is fastened to its supporting-plate, with the clamping-pin in the position which it occupies when first inserted; Fig. 14, the same section of the pattern with the clamping-pin turned to a position which draws the pattern securely against its supporting-plate. Figs. 15 and 16 are views of the said clamping-pin in the respective positions which it occupies illustrated in Figs. 13 and 14. Fig. 17 is a plan of the levers and other mechanism by which the trimming-knife is held and operated. Fig. 18 is an elevation of the same parts. Fig. 19 is a plan of the trimming-knife holder and adjusting-wheels; Fig. 20, an elevation of the same; Fig. 21, a vertical section through the holder and a portion of the clamping-pattern and material to be trimmed, with the knife in position for trimming. Fig. 22 shows three views of the trimming-knife—an end, front, and edge view. Fig. 23 is a side elevation of the machine, partly in section, showing the mechanism by which the blank-cutting knife and supplemental feed-roller are operated; Fig. 24, a front elevation of the blank-cutting knives and the mechanism by which the upper knife is operated. Fig. 25 is a side elevation of a portion of the machine, showing the mechanism by which the frame of the blank-cutting knives may be adjusted in relation to the blank-support. Fig. 26 is a vertical cross-section of the same parts on line 26 26, Fig. 25. Fig. 27 is a detail section, through the sliding frame and its guides, of the upper blank-cutting knife on line 27 27, Fig. 24. Fig. 28 is an enlarged perspective view of the portion of the machine shown in Fig. 7 as seen from a position a little to the rear, more clearly exhibiting the mechanism that feeds the material and determines the amount which is to be fed at each intermittent movement.

Similar letters indicate the same parts of the machine throughout the drawings.

Referring to the drawings, Fig. 1, A is the frame of the machine; $a$, the main shaft, from which the operating parts are driven; $a'$, the main driving-gear; $a^2$, the cam-wheel, which operates the upper blank-cutting knife; $a^3$, the cam which by means of the cord or rod $k^{15}$ and lever $k^{16}$ draws down the free end of the lever that supports the trimming-knife, and thereby forces the knife through the stock at the beginning of the trimming operation.

$a^4$ is a double cam-wheel, the cam-groove in the inner face of which operates a lever $m^{20}$, which actuates the stock-feeding pawl, while the cam on the periphery of the wheel $a^4$ operates a rod $m^{25}$, which raises the measuring-finger for a short interval at the beginning of the feeding operation for the purpose hereinafter described.

$a^5$ $a^6$ are a pair of beveled gears, one upon the end of the shaft $a$ and the other upon the lower end of the shaft $b$. Upon the shaft $b$ is a series of cams which operate the arms and levers that carry the stock-support and clamping-pattern and the trimming-knife. The wheel $b'$ has a cam-groove in its lower face engaged by a cam-roll which is held by a lug on the side of the arm $H'$. This cam swings the frame $H H'$ back and forth upon the shaft $i$. Another cam $b^2$ upon the top of the wheel $b'$ operates upon the arm $k$, which supports the trimming-knife, so as to hold it away from the clamping-pattern while a blank is being placed upon its support and clamped by the pattern. The wheel $b^3$ has a cam-groove $b^4$ in its upper face, which is engaged by a cam-roll $k^6$ upon the cam-slide $k^5$, which is one member of the compound lever $k$ $k^2$ $k^5$. (See Fig. 17.) Upon the edge of the wheel $b^3$ is a cam $b^5$, which serves to depress the fingers $l^2$ $l^2$ to a position where they will engage the sole which has been cut and the scrap about it and remove them from the stock-support when it is swung back to the blank-cutting knives.

The wheel $b^6$ has a cam-groove $b^7$ in its periphery, (see dotted lines, Fig. 3,) which is engaged by a cam-roll $d^4$ upon the lever $d'$, which lever is pivoted to the frame of the machine at $d^3$. On the upper end of the shaft $b$ is a segmental gear $b^8$, which meshes with a smaller segmental gear $b^9$, keyed to the shaft $i$. Near the upper and lower ends of the shaft $i$ are secured bevel-gears $i'$ $h'$, and these mesh, respectively, with other bevel-gears $i^2$ and $h^2$ on shafts $i^3$ $h^3$. Upon the opposite end of the shaft $i^3$ is a bevel-gear $i^4$, and this engages a bevel-gear $i^5$ on the upper end of the shaft $g$. To the lower end of the shaft $g$ the clamping-pattern $p$ is secured, Fig. 1.

On the end of the shaft $h^3$ opposite to the gear $h^2$ is a bevel-gear $h^4$, which meshes with a bevel-gear $h^5$ on the lower end of a short shaft $h^6$, and on the upper end of the shaft $h^6$ the stock-support $s$ is secured. The shafts $g$ and $h^6$ are respectively journaled in the ends of the upper and lower arms $H H'$ of the swinging frame, of which they are a part.

Referring to Fig. 1, it will be readily seen that when power is applied to the gear $a'$ the shaft $a$ will be turned, and through the bevel-gears $a^5$ $a^6$ motion will be given to the shaft $b$ and the cams and segment-gear $b^8$ thereon. The form of the gears $b^8$ and $b^9$ is shown in Fig. 8, from which it will be understood that the gear $b^9$ will be caused to rotate only one-half of the time—that is, by reason of the plain portions upon the periphery of the two gears $b^9$ will make only the same number of revolutions as $b^8$, although its diameter is but one-half that of the gear $b^8$, so that the stock-support $s$ and the clamping-pattern $p$ will be intermittently rotated together. During the interval when they are not rotating they are being swung inward to the blank-cutting knives $f$ $f'$ to receive a blank and out again ready to be rotated and cause the trimming-knife to cut a sole or other article to correspond with the outline of the clamping-pattern.

The clamping-pattern $p$ is secured to a holder $p'$ by means hereinafter more particularly described, and this holder has a sleeve $g'$ projecting upward from it, which slides over the shaft $g$ and is fastened thereto by a pin passing through the two. This clamping-pattern is raised and lowered by means of a lever $d$, which is pivoted to the swinging frame H at $d^2$, and has a slot in its end, into which projects a pin $g^2$, which is fastened to a sleeve $g^3$ on the shaft $g$ above the sleeve of the holder $p'$. (See Fig. 3.) The upward movement of the sleeve $g^3$ is limited by a shoulder on the shaft $g$ and the downward movement by the top of the sleeve $g'$, and the longitudinal movement of the shaft $g$ through its bearings in the end of the upper arm of the frame H and through the sleeve $g^3$ is permitted by the bar $g^4$, which is secured to the top of the shaft $g$ and has a hole in each end that fits over and slides upon a bolt $g^5$, each of which is made fast to the gear $l^5$, and by means of which the shaft $g$ is caused to rotate with that gear. The lever $d$ is caused to tilt on its pivot $d^2$ through its connection with the lever $d'$, pivoted to the frame A at $d^3$, on which pivot it is caused to vibrate up and down by the engagement of its cam-roll $d^4$ with the cam-groove $b^7$ in the periphery of the wheel $b^6$. The connection between the levers $d$ and $d'$ is made through a shouldered sleeve $d^5$, adapted to slide upon the shaft $i$, the end of each lever being attached to the sleeve $d^5$ by what may be termed a "gimbal-ring joint," consisting of split rings $d^6$, which surround grooved collars $d^7$ on the sleeve $d^5$ and the yoke-shaped ends $d^8$ of the levers, which encompass said rings and are jointed thereto by screw-bolts $d^9$. The construction is shown in transverse and longitudinal sections in Figs. 5 and 6.

In order to give a yielding pressure of the lever $d$ upon the pattern $p$, a spring $d^{10}$ is placed around the sleeve $d^5$ between the collars which hold the split rings $d^6$ of the two levers $d$ $d'$.

For the purpose of giving greater rigidity to the swinging frame H a bracket B is provided, upon which runs a small roller $r$, which is journaled in a hanger $r'$, projecting from the lower arm H' of the frame. (See Figs. 1 and 2.)

The trimming-knife holder is supported at the end of a flexible arm $k$. The opposite end of the arm $k$ is jointed at $k'$ to another arm $k^2$, which is pivoted at $k^3$ to a projecting bracket on the frame. At $k^4$ on the arm $k^2$ one end of a cam-slide $k^5$ is pivoted. The opposite end of this cam-slide is forked, so as to straddle and slide upon the shaft $b$ through the action of a cam-roll $k^6$, which runs in a cam-groove $b^4$ in the cam-wheel $b^3$. (See Fig. 17.) The arm $k^2$ is flattened at $k^7$ and slides in a slotted bracket $k^8$, which projects from the rear of the frame A, and to provide an additional support for the arm $k$ a small roll $k^9$, which is journaled in a projection therefrom, bears upon a lever $k^{10}$, which is pivoted on the shaft $i$. The lever $k^{10}$ is supported at its free end by a roll $k^{11}$, which bears upon a curved track $k^{12}$, that extends out from the machine-frame, and the said lever $k^{10}$ is caused to swing outward upon its pivot $i$ by the action of the cam $b^2$ upon a cam-roll $k^{13}$ on the lever $k^{10}$, (seen in dotted lines, Fig. 17,) and it is pulled constantly inward by the action of a spring $n$, attached at one end to the frame of the machine and at the other fastened near the free end of the lever. The arm $k$ is caused to swing out and in with the lever $k^{10}$ by means of a link $k^{14}$, which connects the two together.

To the free end of the arm $k$ a sleeve $k^{17}$ is fastened, and within this sleeve the cylindrical shank $k^{18}$ of the trimming-knife holder $k^{19}$ is supported by a washer $k^{20}$, (see Figs. 19 to 21,) and to reduce friction ball-bearings may be provided at the upper and lower ends within the sleeve $k^{17}$. A gage-roll $k^{21}$ upon a pin $k^{22}$ bears upon the upper edge of the clamping-pattern $p$ and keeps the trimming-knife $k^{23}$ at a uniform distance from the lower edge of the pattern during the cutting operation. The knife is held in clamping-jaws $k^{24}$ by a bolt $k^{25}$. As in our prior machine, the blade of the trimming-knife is constantly kept tangent to the varying curves of the pattern by means of a plate $k^{26}$, arranged to slide upon the knife-holder $k^{19}$ against the action of a spring $k^{27}$ on a rod $k^{28}$, which extends from the rear of the holder $k^{19}$. The sliding plate $k^{26}$ has two arms, which extend along the sides of the holder $k^{19}$, and in the forward ends of these arms are antifriction-rolls $k^{29}$, which bear upon the edge of the pattern $p$ during the trimming operation and serve to keep the blade of the knife tangent to the curves of that pattern at every position thereon.

In order to keep the knife-holder in proper position when not in contact with the pattern, a short arm $k^{30}$ extends up from the slide-plate $k^{26}$ and is provided with a roll $k^{31}$, which bears upon a plane surface in a groove in the side for the sleeve $k^{17}$, so that as the rear end of the holder $k^{19}$, with the rod $k^{28}$, swings from side to side the pressure of the spring $k^{27}$ upon the slide $k^{26}$ and through it upon the roll $k^{31}$ tends to keep that roll substantially at the middle of the plane surface of the groove.

The gage-roll $k^{21}$ is held in firm contact with the edge of the pattern $p$ during the trimming operation by a spring $n$, one end of which is attached to the lever $k^{10}$ and the other to the frame of the machine, (see Fig. 17,) and while the blank support and clamp are being swung to the blank-cutting knives and back again the trimming-knife and holder are prevented from following them by the action of the cam $b^2$ upon the roll $b^{13}$, which has its bearing on the lever $k^{10}$. (Shown in dotted lines, Fig. 17.)

When cutting rubber soles, it is desirable that the edge should be beveled, and to accomplish this the clamping-jaws $k^{34}$ at the forward end of the knife-holder are made at the proper angle to hold the knife in the desired position, as shown in Figs. 20 and 21, and to accommodate this projecting portion of the knife-holder an angular groove $p^2$ is cut around the edge of the pattern.

For convenience and economy the pattern is constructed chiefly of wood or other inexpensive and easily-worked material, with a metal plate upon the upper and lower sides. The lower plate is a little larger than the upper one and also has its edge turned down, so as to insure a firm pressure at the edge where the material is cut. The pattern $p$ is secured to its holder $p'$ by a cam-pin $p^3$, the lower end of which is formed with rectangular projections $p^4$, provided with inclined or cam-shaped upper surfaces $p^5$. The pattern is first pressed up against the holder $p'$ until the centering or alining pins $p^6$ enter holes in the pattern and the lower end of the cam-pin $p^3$ enters a rectangular hole $p^7$ in the top plate of the pattern in the position shown in Fig. 13. The cam-pin is then given a quarter-turn to the position shown in Fig. 14, and the cam projections, by pressing upon the under side of the upper plate, draw the pattern firmly against the holder $p'$. It will thus be seen that patterns can be very easily changed and with small waste of time.

As explained in our said prior patents, when feeding sheets of unvulcanized india-rubber which are embossed with ornamental or designating figures it is necessary to so regulate the feeding that each of such figures will be placed over the middle longitudinal line of the pattern in order that the figures may be located in the middle of the sole or other article cut in accordance with the pattern. In our prior machine the device or finger which measured or determined the amount of material to be fed forward at each intermittent movement thereof swung in the arc of a circle, and therefore its lower end would rise after the finger left a perpendicular position, so that when any projection on the material which engaged and moved the measuring-finger chanced to be lower than the average that finger would often slip over the projection before the completion of the previously-determined amount of feeding, and thus inaccurately set the feeding mechanism for the next succeeding stroke. Our improvements obviate this difficulty, as the lower end of the finger moves in a horizontal line, the construction and operation of which will be better understood by reference to the drawings. In Fig. 7, which is a right-hand end view of the machine, $m$ is a shaft which extends across the width of the frame of the blank-cutting knives and is connected with another shaft $m'$ by a link $m^2$ at either end, the shaft $m'$ having a bearing at each end in extensions of the frame. (See also Fig. 28.) Upon the end of the shaft $m$ a depending arm $m^3$ is secured and has a wheel $m^4$ journaled at its lower end. Beneath the wheel $m^4$ is a horizontal track $m^5$, upon which the wheel $m^4$ normally rests and runs to and fro as the arm $m^3$ swings. As the wheel $m^4$ moves back and forth on the horizontal track $m^5$ the shaft $m$ is permitted to move up and down on the links $m^2$, which are loose on the shaft $m$, and the measuring-finger $m^6$, (shown in Fig. 28,) which is also secured to the shaft $m$ in a position which will place its lower end in the line of the projections on the material, will swing with the arm $m^3$ and the lower end of the finger will move in the same horizontal plane as the axis of the wheel $m^4$. The track $m^5$ is supported in a bracket $m^7$ and may be adjusted by means of a screw $m^8$. The lower end of the arm $m^3$ is attached by a connecting-line $m^9$ to a curved track $m^{10}$, provided with a guard $n^{10}$ upon its inner edge, for the purpose hereinafter described, and which extends along a short arc of the periphery of the feed-ratchet $m^{11}$. The track $m^{10}$ is secured to the upper end of a radial arm $m^{12}$, pivoted on the shaft $m^{13}$ of the feed-roll $m^{14}$. (Seen in Fig. 23.) $m^{15}$ is the pawl which engages and turns the ratchet-wheel $m^{11}$ and is held in engagement therewith by a spring $m^{16}$ between the pawl and a projecting part of an arm $m^{17}$. The pawl $m^{15}$ is pivoted to the arm $m^{17}$, which also turns on the shaft $m^{13}$, and this arm is tilted forward and back by means of a lever $m^{18}$, pivoted to the arm $m^{17}$ at $m^{19}$. The lever $m^{18}$ is adjustably connected with a cam-slide $m^{20}$, (see Fig. 2,) the forked lower end of which slides over the shaft $a$, and by means of a cam-roll $m^{21}$, near the fork of the cam-slide $m^{20}$, which runs in a cam-groove in the face of the wheel $a^4$, the slide $m^{20}$ is given a longitudinal movement up and down, and by its connection with the arm $m^{17}$ at $m^{19}$ causes that arm to swing back and forth and at each stroke turn the feed-roller through the operation of the pawl $m^{15}$ upon the ratchet-wheel $m^{11}$. The pawl $m^{15}$ is provided with a pin $m^{22}$, which bears upon the curved guard $n^{10}$, and this guard holds the pawl from contact with the ratchet $m^{11}$ while the pin is within the limits of the guard $n^{10}$; but to insure the positive engagement of the pawl $m^{15}$ with the ratchet when it is drawn forward a cam-surface $m^{23}$, attached to the forward end of the track $m^{10}$, is provided, and as the pin $m^{22}$ moves forward it strikes beneath the cam-surface $m^{23}$ and is thereby pressed downward just as it leaves the guard $n^{10}$ and positively forces the pawl $m^{15}$ into the teeth of the ratchet. A light spring $m^{24}$, attached to the top of the piece $m^{23}$, is bent downward, so that its free end rests very near to the ratchet-teeth. In the forward movement of the pawl $m^{15}$ the pin $m^{22}$ readily passes beneath the spring; but in the return movement of the pawl $m^{15}$ the pin $m^{22}$ strikes upon the top of the spring, rides up onto it, and thus lifts the pawl $m^{15}$ and completely disengages it from the ratchet, and also prevents the pin $m^{22}$ from catching upon the end of the guard $n^{10}$ and obviates the chance of disarranging it.

In order to prevent any movement of the track $m^{10}$ and its guard $n^{10}$ while the pin $m^{22}$ of the pawl $m^{15}$ is upon the said guard, a brake $n^{11}$ on one arm $n^6$ of a rock-lever $n^5$ is caused to press upon the track $m^{10}$ by means of a cam-roll $n^9$ on the other arm $n^7$ of said rock-lever, which cam-roll $n^9$ is thrown outward by a cam $n^8$ on the hub of the arm $m^{17}$. While the pawl $m^{15}$ is in engagement with the ratchet-wheel $m^{11}$, the shape of the cam $n^8$ permits the roll $n^9$ and the arm $n^7$ to swing inward by the action of a spring upon the arm $n^7$. This inward swing of the lower arm $n^7$ of the rock-lever raises its upper arm $n^6$ and withdraws the brake $n^{11}$ from the track $m^{10}$, leaving it free to be again adjusted by the operation of a projection on the moving material upon the finger $m^6$, which through the shaft $m$, arm $m^3$, and link $m^9$ sets the guard $n^{10}$ in a position to determine the beginning of the next feeding movement. (See Figs. 7 and 28.)

For a short interval at the beginning of each feeding movement it is necessary to raise the measuring-finger $m^6$ sufficiently to permit the projection upon the material which last acted upon the said finger to pass under it. Otherwise the adjustment of the track $m^{10}$ and guard $n^{10}$ beside the ratchet-wheel $m^{11}$ might be disturbed. This raising of the finger is accomplished by means of a rod $m^{25}$, with a forked slide at its lower end which straddles the shaft $a$, and a cam-roll $m^{26}$, which is acted upon by a cam $m^{27}$ on the periphery of the wheel $a^4$. (See Figs. 1 and 2.) This cam at the proper moment forces the rod $m^{25}$ upward far enough to strike the under side of the link $m^2$ and raise it, together with the shaft $m$ and the attached measuring-finger and arm $m^3$ with the wheel $m^4$. In the top of the rod $m^{25}$ is a slot $m^{28}$, through which projects a pin $m^{29}$ from the bracket $m^{30}$. (See Fig. 7.) By this means the rod $m^{25}$ is permitted to move up and down freely, and yet its upper end is properly controlled. The extent of the cam $m^{27}$ is only sufficient to hold the finger $m^6$ in the raised position while one of the projections on the material is passing under. The arm $m^3$ is prevented from swinging uncontrolled by a spring $m^{31}$, attached thereto and to the bracket $m^{30}$, which constantly holds the arm $m^3$ against an adjusting-screw $m^{32}$, which works in a threaded sleeve $m^{33}$ in said bracket and by means of which the arm $m^3$, and with it the measuring-finger $m^6$, may be adjusted in relation to the blank-cutting knives.

To insure positive feeding of the material, rolls $c$, Figs. 2 and 23, are placed over the feed-roll $m^{14}$ and bear with sufficient pressure thereon to pinch the stock and cause the feed-roll to push it forward onto the blank-support $s$. To further facilitate the feeding of the sheet of unvulcanized india-rubber U, it is carried over a roll $c'$, which is positively driven by a belt $c^2$ from a pulley $c^3$, loose on the shaft $c^4$, but made fast to a ratchet $c^5$, which is intermittently turned by a vibrating pawl-lever $c^6$, operated by an eccentric $c^7$ on the shaft $a$ through the rod $c^8$. (See Fig. 23.)

The upper blank-cutting knife $f$ is supported at the upper part of a frame $f^{10} f^{10} f^{11} f^{11}$, which frame is moved up and down by a cam-slide $f^3$ in the guides $f^2$, which are attached to the lower knife-frame. The cam-slide $f^3$ carries a cam-roll $f^4$, which runs in a cam-groove in the wheel $a^2$. The lower end of the cam-slide $f^3$ is forked, so as to straddle and slide over the shaft $a$. (See Fig. 24.)

The combined frames of the blank-cutting knives are supported upon a horizontally-sliding frame $f^5$, which may be adjusted out or in by the pinions $f^6$, which engage racks $f^7$ on the under portion of the frame at either side. The pinions $f^6$ on the shaft $f^8$ are operated by the hand-lever $f^9$. (See Figs. 25 and 26.) This adjustment of the blank-cutting knives is sometimes required to accommodate irregularities in the shape of the article which is being cut by the trimming-knife.

In Fig. 2, D' is a hand-wheel for use when the machine is being adjusted at the beginning of the operation. $D^2$ is an intermediate gear between a small gear on the driving-shaft D and the gear $a'$ on the shaft $a$.

When the end of the stock to be cut has been fed onto the support $s$ and a blank cut off, the pattern $p$ is forced down upon it, thus clamping the stock upon that support. The two are then swung away from the knives $f$ $f'$ by the action of the cam in the lower side of the wheel $b'$ upon the arm H', and when the gage-roll $k^{21}$ on the trimming-knife holder has been moved into contact with the edge of the pattern $p$ and just before the pattern begins to turn the knife $k^{23}$ is pulled downward and forced through the stock U by the action of the cam $a^3$ upon the lever $k^{16}$, which is connected with the arm $k$ by the chain or cord $k^{15}$, which preferably has an interposed spring. After the article has been cut from the blank the pattern is raised and, with the support $s$, begins to move back again toward the knives $f f'$, and at this moment the wheel $b^3$ is in a position to bring the cam $b^5$, which is on its periphery, into contact with the end of the crank-lever $l$ made fast to the end of the rod $l'$. (See Fig. 17.) To this rod $l'$ two fingers $l^2$ are fastened, and as the cam $b^5$ passes under the lever $l$ and raises it the rod $l'$ is turned and the fingers $l^2$ are lowered until they rest upon the material which is on the support $s$, and as that moves toward the knives $f f'$ the fingers hold the scrap and the article cut from the blank of stock and push them off the support $s$ onto a carrier-apron $o$ immediately beneath. This apron runs over rollers $o'$, one of which may be seen in Figs. 1 and 2, this one being turned by a band $o^2$ from a pulley on the shaft $a$.

We claim—

1. In a machine for cutting articles from sheet material which is provided with projections to operate devices that determine the amount of material which is fed to the cutting-knives at each successive operation of the intermittent feeding mechanism therein, a pendent finger the lower end of which is in the path of movement of the projections on the material, a horizontal shaft to which said finger is secured, which shaft is hung in a vertically-tilting support, a pendent arm secured at its upper end to the same shaft and at its lower end connected to the feed-regulating devices, a wheel journaled at the lower end of the pendent arm and a horizontal track for said wheel, which causes the end of the pendent finger to move in the same horizontal plane as the axis of the wheel when the latter traverses its track.

2. In a machine for cutting articles from sheet material which is provided with projections to operate devices that determine the extent of each successive operation of the intermittent feed therein, a finger hanging in the path of movement of said projections and a pendent arm, both secured to the same vertically-tilting support, an antifriction-wheel at the lower end of the pendent arm and a vertically-adjustable horizontal track for said wheel by which the end of the finger may be adjusted in relation to the surface of the material beneath, and caused to move in a horizontal line over such surface.

3. In a machine for cutting articles by pattern from sheet material, a revolving pattern, a trimming-knife in a swiveling holder which is maintained in proper position by the pattern during the trimming operation and means to maintain the swiveling holder in normal position when withdrawn from contact with the pattern substantially as described.

4. A pattern for clamping material which is to be cut in accordance therewith, consisting of a lower plate having a contour like that of the article desired, and a beveled clamping edge, an upper knife-guiding plate of substantially the same contour as the lower plate and a third plate interposed between the other two and provided with a grooved edge to accommodate the trimming-knife holder when the pattern revolves.

5. A pattern for clamping material which is to be cut in accordance therewith, consisting of a metal lower plate having a beveled clamping edge, a metal upper knife-guiding plate having a contour substantially the same as that of the article desired, and a third plate of similar contour and cheaper material interposed between said clamping and guiding plates, and provided with a grooved edge to receive the trimming-knife holder.

6. In a machine for cutting articles by pattern from sheet material, a revolving pattern provided with a grooved edge to receive the trimming-knife holder, and a cam-pin $p^3$, to readily lock and unlock the pattern and its support.

VICTOR BEAUREGARD.
CHARLES S. GOODING.

Witnesses:
C. R. HENRY MARSH,
SYDNEY E. TAFT.